United States Patent [19]
Amberg

[11] 3,797,369
[45] Mar. 19, 1974

[54] METHOD AND APPARATUS FOR ASSEMBLING COMPOSITE CONTAINERS

[75] Inventor: Ralph G. Amberg, Monticello, Ind.

[73] Assignee: Owens-Illinois, Inc., Toledo, Ohio

[22] Filed: Feb. 14, 1972

[21] Appl. No.: 225,818

Related U.S. Application Data

[63] Continuation-in-part of Ser. No. 162,400, July 14, 1971, Pat. No. 3,759,437.

[52] U.S. Cl. .............................. 93/36.01, 93/39.3
[51] Int. Cl. ............................................ B31b 11/00
[58] Field of Search ............................. 93/36.1, 39.3

[56] References Cited
UNITED STATES PATENTS

| | | |
|---|---|---|
| 1,766,420 | 6/1930 | Wessman et al. .................. 93/39.3 |
| 1,756,243 | 4/1930 | Benson ............................. 93/39.3 |
| 3,134,307 | 5/1964 | Loessen ........................... 93/36.1 |

Primary Examiner—Andrew R. Juhasz
Assistant Examiner—Leon Gilden
Attorney, Agent, or Firm—Thomas A. Meehan; Edward J. Holler

[57] ABSTRACT

Method and apparatus for assembling a composite container which consists of a cup-shaped inner shell and a sleeve-type overwrap adhesively bonded to the exterior sidewall of the shell. Sleeve blanks are cut to shape, formed into their final configuration and inserted into a cup-shaped recess in a holder mounted upon an endless conveyer. The abutting edges of the inserted sleeve are axially aligned and the sleeve is accurately seated within the holder. The holder then carries the sleeve beneath a cup transfer mechanism which deposits the cup-shaped inner shell of the composite container into the sleeve. Prior to its insertion in the sleeve, the exterior side surface of the cup is coated with a suitable adhesive. After the cup is placed within the sleeve in the holder, the holder passes beneath a cup tamping mechanism which axially presses the cup downwardly into the sleeve to firmly bond the sleeve and cup to each other.

7 Claims, 10 Drawing Figures 3,797,369

METHOD AND APPARATUS FOR ASSEMBLING COMPOSITE CONTAINERS

REFERENCE TO RELATED APPLICATION

The present invention is especially suitable for assembling composite containers of the type disclosed in my commonly owned co-pending application Ser. No. 162,400, filed July 14, 1971 and this application is a continuation-in-part of my co-pending application Ser. No. 162,400, filed July 14, 1971 now U.S. Pat. No. 3,759,437.

BACKGROUND OF THE INVENTION

In my co-pending application Ser. No. 162,400, there is disclosed a composite container which consists of a cup-shaped inner shell formed of a thermoplastic material having a sleeve-type overwrap of a different material adhesively bonded to its exterior sidewall. As developed in greater detail in application Ser. No. 162,400, this particular arrangement affords the possibility for several different types of manufacturing economies. For many uses, it is desired to use a cup-shaped container of a thermoplastic material, such as polystyrene, polyethylene, etc., whose characteristics are particularly suited for containers for specific materials. Materials such as polystyrene are relatively expensive as compared to other packaging materials and hence, particularly for large production runs, it is desirable to reduce the amount of polystyrene in each container as much as is possible consistent with the strength requirements of the container. The composite container of my application Ser. No. 162,400, enables the employment of a reduced quantity of the relatively expensive thermoplastic material by adhesively bonding a sleeve overwrap of some less expensive material to achieve the desired structural strength of the completed container.

Alternatively, the employment of a composite container with a sleeve overwrap affords a wide degree of flexibility in package labeling and decoration. The inner sleeve, or cup may for example be of a material which poses printing problems. Further, it is much easier to print a flat label than it is to apply printing to the sidewall of a frusto-conical cup. Standard cups may be produced in large quantity production runs and labeled in relatively small quantities for individual customers.

The foregoing advantages of a composite cup all assume that the composite container can be assembled on a mass production basis with an economic advantage. The present invention is especially directed to methods and apparatus for achieving this objective.

Various objects and features of the invention will become apparent by reference to the following specification and to the drawings.

IN THE DRAWINGS

The present invention is directed to a method and apparatus for assembling, on a production line basis, a composite container such as that which forms the subject matter of my commonly owned copending application Ser. No. 162,400, filed July 14, 1971. The composite container which is the subject of application Ser. No. 162,400 consists of a frusto-conical cup-shaped container or inner shell having a frusto-conical sleeve adhesively bonded to its exterior side wall. As explained in greater detail in application Ser. No. 162,400, the cup-shaped inner shell is formed of a thermoplastic material, as, for example, polystyrene, polypropylene, etc., which is relatively expensive in terms of mass production quantities, while the sleeve or overwrap may be made of a relatively inexpensive material, such as paper board, which will provide a reinforcing function enabling the cup-shaped inner shell to be made of an extremely thin wall thickness, thereby reducing the overall cost of materials. Other advantages to employing the paper board overwrap are in the areas of labeling and decoration, as discussed in detail in application Ser. No. 162,400.

GENERAL DESCRIPTION

Figure 1:
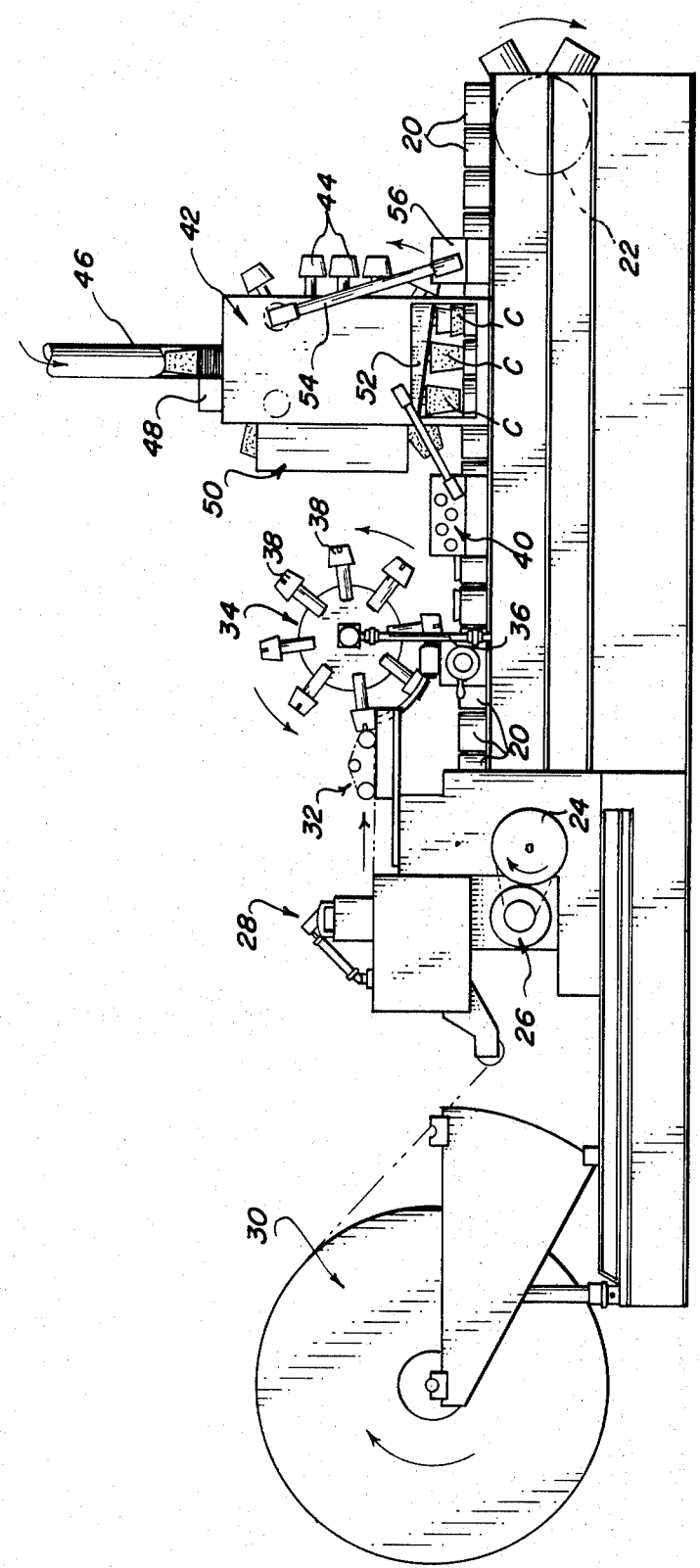
FIG. 1 is an overall side elevation of a machine embodying the present invention, with certain parts broken away, omitted, or illustrated in a schematic fashion.

Referring now to FIG. 1, there is shown a somewhat schematic side elevation of a machine for assembling a composite container of the general type described in application Ser. No. 162,400. The machine includes a series of holders 20, described in more detail below, which are linked together into an endless chain trained about end sprockets indicated at 22 and 24 for movement along an endless path in a clockwise direction as viewed in FIG. 1. The holders 20 are driven in continuous movement along their endless path by a suitable drive designated generally 26. Te sleeves or overwraps S are cut in the shape of a development of a frusto-conical surface (see FIG. 3) by a cylically operated cutter designated generally 28. A supply roll 30 of paper board or other suitable material for the sleeves S is mounted directly on the machine and fed to cutter 28 by suitable mechanism of conventional design. From cutter 28, the sleeve blanks S are fed in a flattened condition by feeding mechanism including a feeder 32 into operative relationship with a sleeve pick up wheel designated generally 34 which is driven in rotation in a counter-clockwise direction as viewed in FIG. 1 by a suitable drive coupling partially indicated at 36 driven from main drive 26 by conventional structure, not shown. Sleeves S delivered into a ready positon by feeder 32 are transfered by mandrels 38 on pick up wheel 34 into holders 20 in a manner described in more detail below.

The sleeves are accurately positioned within the respective holders 20 by mechanism which includes a sleeve tamper designated generally 40 and conveyed by holders 20 into operative relationship beneath a cup feeder sub assembly designated generally 42. Cup feeder assembly 42 includes a plurality of mandrels 44 linked together into an endless chain and driven in movement in a counter-clockwise direction, as viewed in FIG. 1, about a generally rectangular path which carries the mandrels successively beneath a cup supply chute 46. A paddle-type dispenser schematically indicated at 48, of well known construction, dispenses cups C from chute 46 onto mandrels 44 as the mandrels pass successively beneath the discharge end of the chute. As the cups C carried on mandrels 44 move downwardly along the left hand run of their path, as viewed in FIG. 1, they pass into operative relationship with an adhesive applicator designated generally 50 which applies a coating of an air drying type adhesive to the exterior of the sidewall of each cup. As mandrels 44 pass along the lower horizontal run of their endless path, inclined cams 52 engage the adhesive coated cups C and strip the cups from the mandrels to cause the cups to drop within the interior of a sleeve S carried by a holder 20 which is immediately below the mandrel at this time. AS was the case with the sleeve pick up wheel 34, the endless chain of cup handling mandrels 44 is driven in synchronism with holders 20 by a drive coupling 54 which forms part of a conventional drive connection between the chain of mandrels 44 and main drive 26. As the cup C, now located within a sleeve S, is carried by the holder 20 from beneath sub assembly 42 it passes beneath a cup tamper 56 which firmly seats the cup within the sleeve.

The assembled composite container, which now includes a sleeve S adhesively bonded to the exterior of the frusto-conical inner shell or cup C is ejected from holder 20 at a suitable location, not shown.

SLEEVE PICKUP AND TRANSFER

Figure 2:
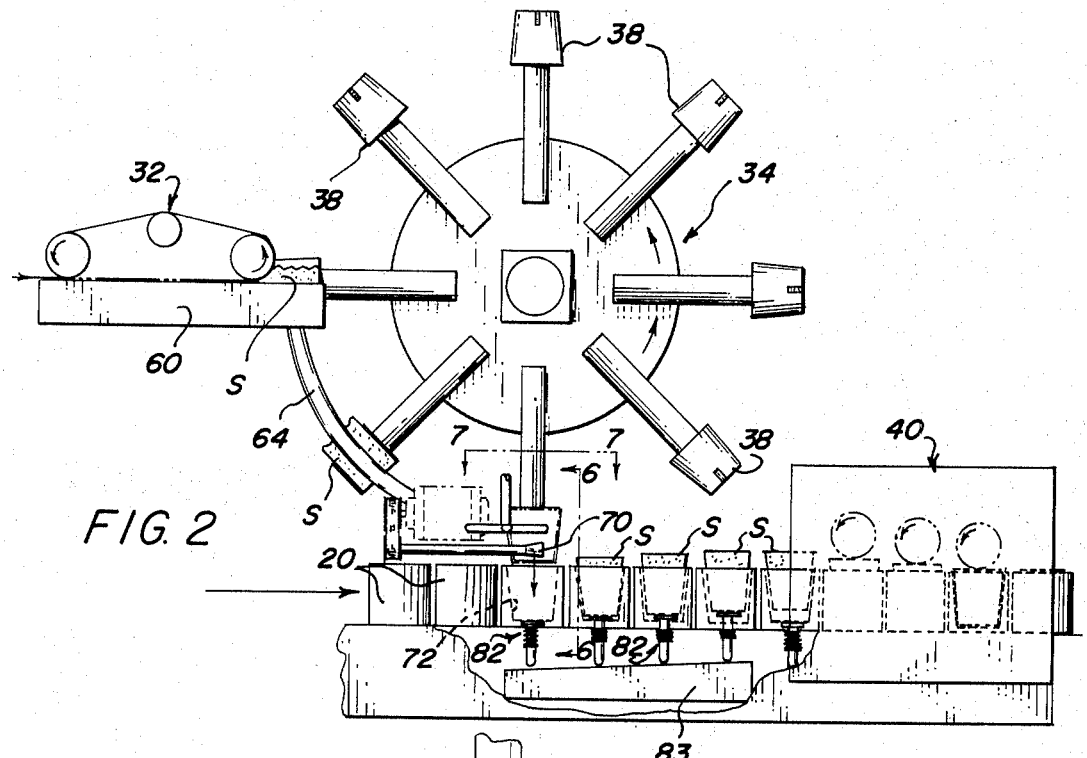
FIG. 2 is a detail side elevational view of the sleeve pick up and transfer mechanism, with certain parts broken away or omitted.
Figure 3:
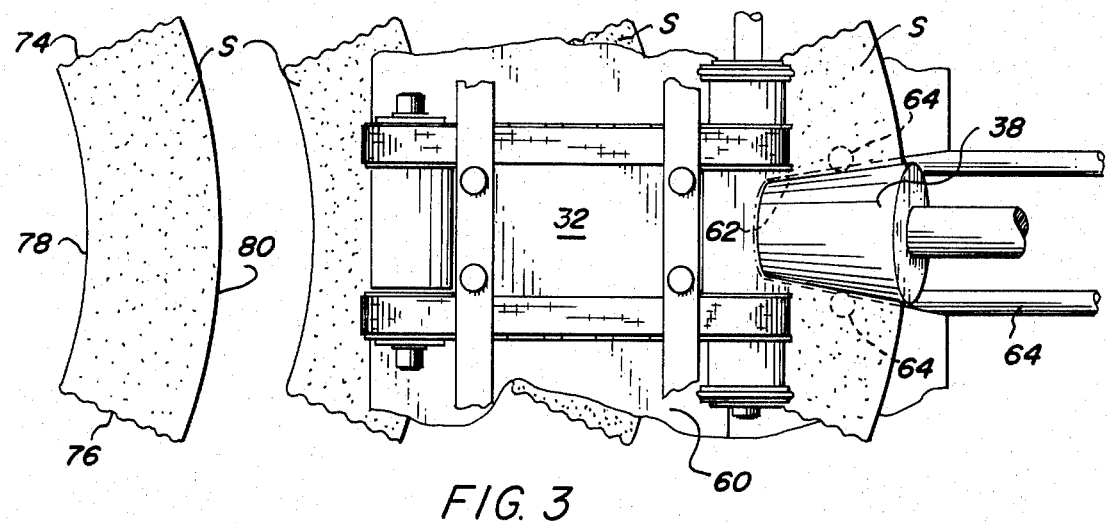
FIG. 3 is a detail top view of a portion of the sleeve pick up mechanism.
Figure 4:
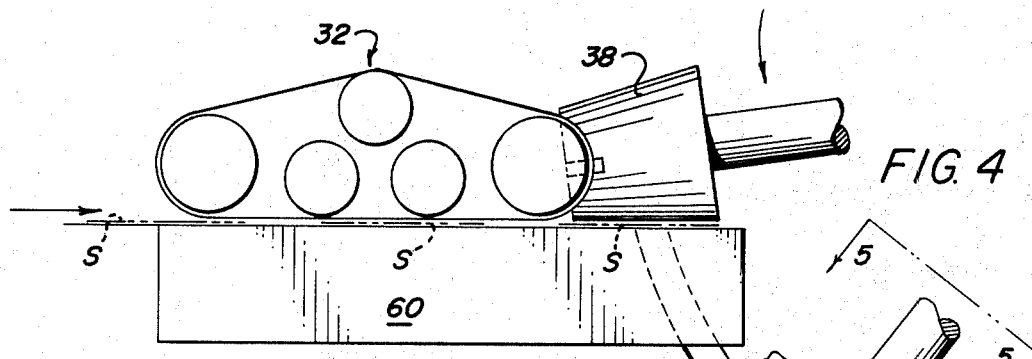
FIG. 4 is a partial side elevational view of a portion of the sleeve pick up mechanism.
Figure 5:
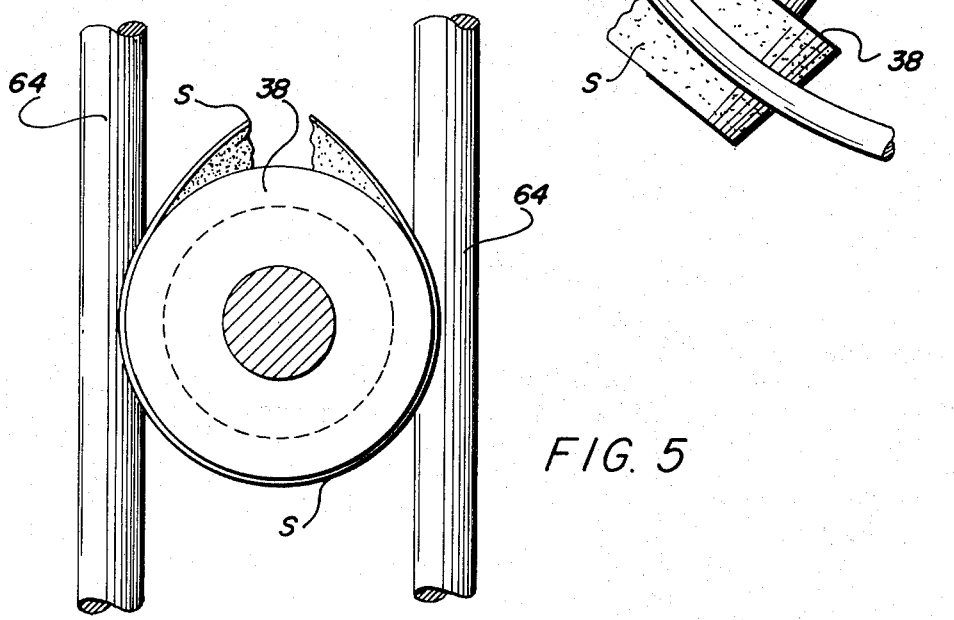
FIG. 5 is a detail view, partially schematic and partially in section, of a portion of the sleeve transfer mechanism taken approximately from the plane 5—5 of FIG. 4.

Details of the sleeve pick up and transfer mechanism are best shown in FIGS. 2 through 7 inclusive. Referring first to FIGS. 2, 3 and 4, the sleeves S, after having been cut to shape by cutter 28 are fed from left to right as viewed in FIGS. 2 through 4, across the flat top surface of a platform 60 by feed mechanism 32. Mechanism 32 is operable to advance the sleeves in succession to the ready position occupied by the right hand most sleeve shown in FIG. 3, in which the sleeve is centered with respect to and overlies an opening 62 cut in platform 60. As best seen in FIG. 3, opening 62 is shaped and located to provide a free passage for mandrels 38, and as each mandrel passes downwardly through opening 62, it begins to bend the sleeve S downwardly through the opening, the sleeve S assuming a generally U-shaped configuration as it passes downwardly through the opening. Extending downwardly from either side of opening 62 are a pair of guide rods 64 transversely spaced from each other as best shown in FIG. 5 to maintain the sleeve S partially wrapped around mandrel 38 as the mandrel is driven from the 9-o'clock position of FIG. 2 to approximately the 6-o'clock position, the guide rods 64 being curved, as viewed from the side, to lie at a constant distance from the axis about which mandrels 38 are rotated.

Figure 6:
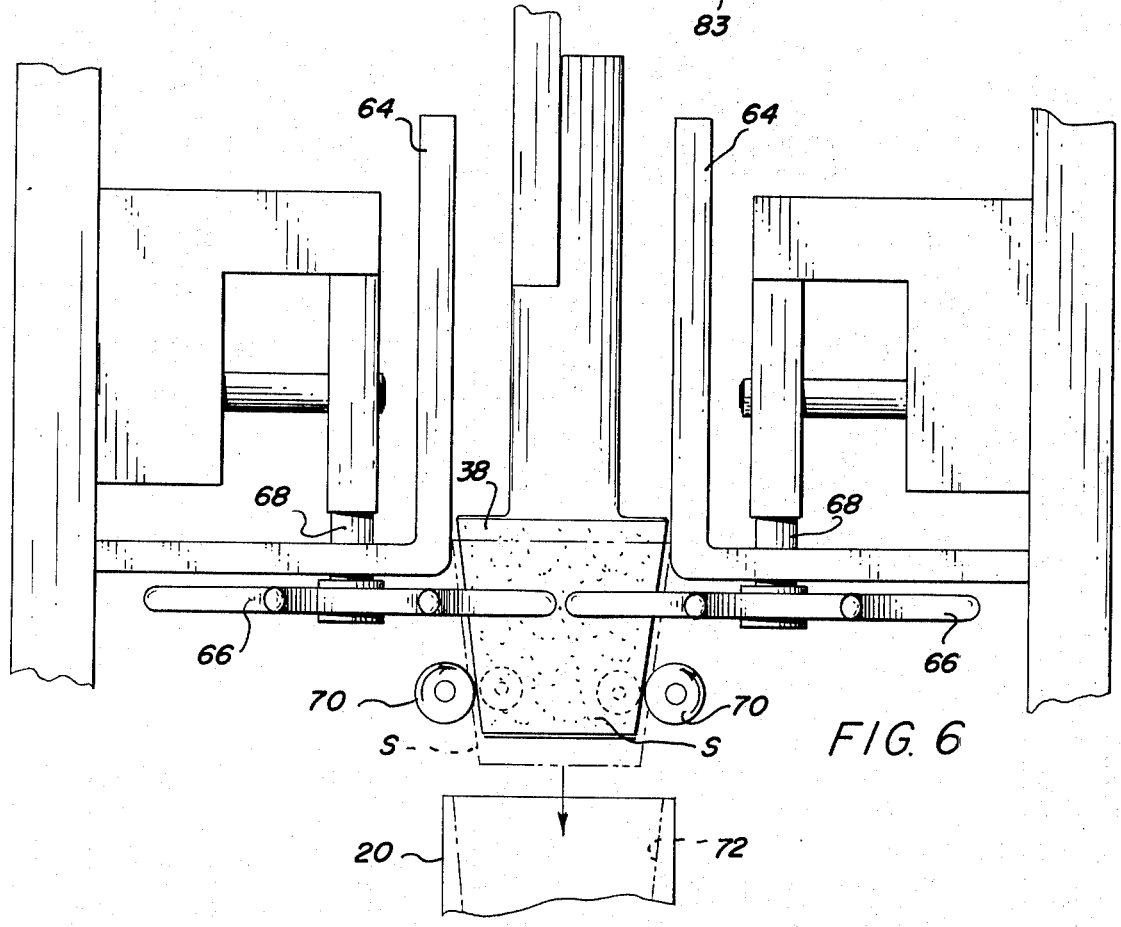
FIG. 6 is a front view of a portion of the sleeve transfer mechanism taken approximately from the plane 6—6 of FIG. 2.
Figure 7:
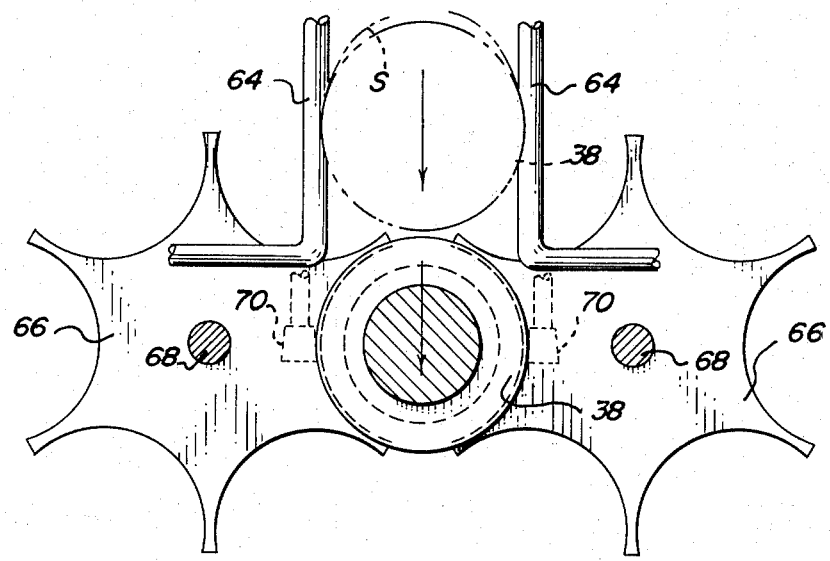
FIG. 7 is a detail cross sectional view taken approximately on line 7—7 of FIG. 2.

Referring now particularly to FIG. 6 and 7, as the sleeve carrying mandrel approaches the 6-o'clock position it engages the projecting teeth of a pair of opposed star wheels 66 which are mounted for free, but frictionally resisted, rotation upon the machine frame by shafts 68. Referring to FIG. 7, in which the two mandrels 38 are shown substantially closer to each other than would be the case in the actual machine, it is seen that as the mandrel engages the star wheels and advances downwardly as viewed in FIG. 7, the opposed star wheels 66 are rotated and begin to close around the mandrel and sleeve until, when the mandrel is directly between shafts 68 of the star wheels, the sleeve has now been closed by the two star wheels into a frusto-conical configuration.

As the complete closure of sleeves by star wheels 66 is accomplished, the sleeve comes into contact with a pair of continuously driven stripping rollers 70 which frictionally engage the sleeve and drive the sleeve axially downwardly to strip the sleeve from the mandrel and deposit the sleeve within a cup-shaped frusto-conical recess 72 formed in a holder 20 which is at this particular moment aligned vertically beneath the mandrel 38. The sleeve passes downwardly through the opposed star wheels, the star wheels holding the sleeve in an approximately closed position until the lower end of the sleeve is located within recess 72.

Referring now momentarily to FIG. 3, it will be observed that the sleeves S are formed with their axially extending or abutting edges (in terms of the assembled sleeve) in an undulating or serpentine shape as at 74, 76. The edges 74 and 76 are complementary in shape to each other so that when the sleeve S is formed into its frusto-conical shape, a projection on edge 74 is received within a concavity in edge 76, the purpose of this procedure being to achieve an exact axial alignment of the small diameter and large diameter edges 78, 80 of sleeve S.

While feed mechanism 32 feeds the sleeve blank S into its ready position with a fairly good degree of alignment, the only forces acting to maintain this original alignment during movement of the sleeve from platform 60 into recess 72 of the holder are frictional forces which, hopefully are balanced as between the right hand and left hand sides of the sleeve as viewed in FIGS. 5 and 6. Thus, it is entirely possible that when the sleeve S is fed into recess 72 of holder 20, the abutting edges 74 and 76 may be offset axially by more than one half of a "cycle" of the serpentine edge, so that as edges 74 and 76 move into abutment the edges exert a self camming action on each other to shift themselves one step out of alignment.

To correct this misalignment, should it occur, each holder 20 is provided with a spider 82 (see FIGS. 2 and 8) supported for axial sliding movement within the lower portion of the holder. Spider 82 includes a grid-like portion 82a (FIG. 8) which defines a part of the bottom of recess 72, and a downwardly projecting rod 82b which is slidably received within a bore in the bottom of the holder. Preferably, spider 82 is spring biased downwardly relative to holder 20 as by springs 82c, FIG. 8. As best seen in FIG. 2, as holder 20 moves to the right from beneath the 6-o'clock position of wheel 34, the downwardly projecting rod of spider 82 engages the upwardly inclined surface of a stationary cam 83 which elevates spider 82 to thereby push sleeve S upwardly within recess 72 of the holder.

The axial elevation of sleeve S within recess 72 is selected to be sufficient so that sleeve S can expand circumferentially, because it is being pushed to a larger diameter section of recess 72, to a degree such that the serpentine edges 74 and 76 are spaced from each other sufficiently so that there is no longer any interference between the proturberances and recesses of the opposed edges 74 and 76. The sleeve S, having been but recently bent into its frusto-conical shape will still posses sufficient resilience to expand circumferentially by an amount sufficient to frictionally retain the sleeve in its axially upwardly projecting position after its holder 20 has passed beyond the right hand end of cam 83 as viewed in FIG. 2 and returned to its original position. It is at this point in time that the holder 20 carrying the upwardly projected sleeve is just entering sleeve tamper 40.

Figure 8:
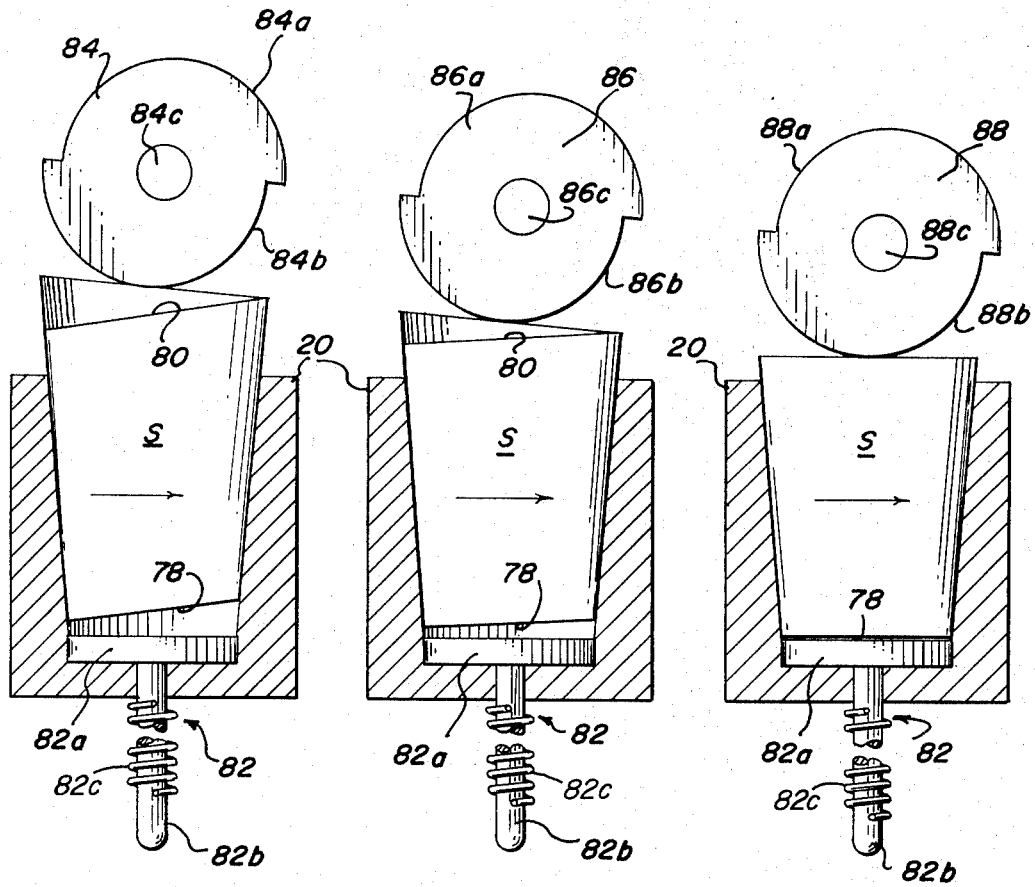
FIG. 8 is a schematic side elevational view of the sleeve seating mechanism.

The primary operative elements of sleeve tamper 40 consist, as best seen in FIG. 8, of three similar tamping cams 84, 86 and 88 driven in rotation in synchronism with the movement of holders 20 by a suitable drive coupling to drive 26. Each of cams 84, 86 and 88 is of identical dimensions, the axial extend of each cam being slightly greater than the maximum diameter of the frusto-conical sleeve S when in its upwardly projected position at the entry to tamper 40. As best seen in FIG. 8, in its circumferential extent, each of the cams includes two 180° sections, 84a and 84b of cam 84, for example, which in essence are semi-circular sections of constant radius whose centers are offset from the axis of rotation of the cam carrying shaft 84c. The axes of shafts 84c, 86c and 88c lie in a plane which is inclined downwardly to the right as viewed in FIG. 8. The three cams are driven in rotation in a counter-clockwise direction as viewed in FIG. 8, the rotation of the cams having the effect of a downwardly inclined surface tending to press the sleeves S downwardly into the cup-shaped recess 74, but doing so with a rolling no slip contact. Because the axial extend of each cam overlaps the entire diameter of the upper of the sleeve S, if the right or left hand side of the sleeve is elevated above the other, it is the elevated side that is pressed downwardly first by the cam.

The circumferential extent of each cam portion 84a, 84b, 85a, etc., is equal to the center-to-center distance between adjacent holders 20 and the speed of rotation of the cam drive shafts 84c, 86c and 88c is selected to be such that the shaft is rotated through one-half a revolution during the passage of each holder 20.

CUP FEED AND TRANSFER

Figure 9:
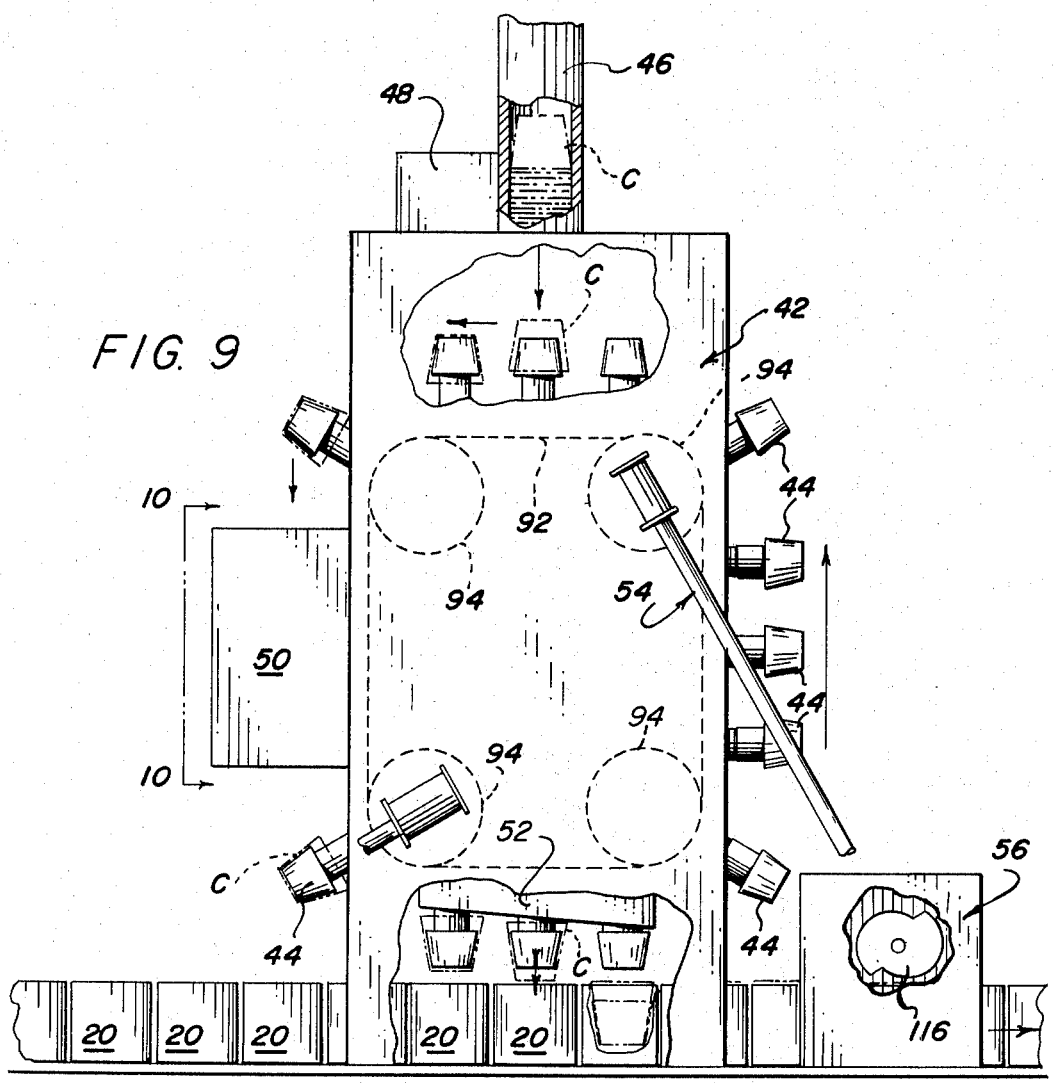
FIG. 9 is a schematic side elevational view of the container handling mechanism.
Figure 10:
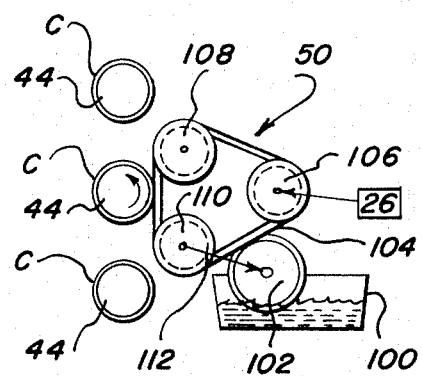
FIG. 10 is a schematic diagram of the adhesive application structure.

Details of the cup feed and transfer mechanism are best shown in FIGS. 9 and 10. Cup feeder 42 includes a plurality of cup-receiving mandrels 44 which are mounted in uniformly spaced succession upon an endless chain indicated at 92 which is trained about four sprockets 94 mounted in the machine frame. One of sprockets 94 is coupled through a suitable drive 54 to be driven from main drive 26 in synchronism with the remaining components of the machine. Chain 92 and mandrels 44 are driven in a counter-clockwise direction as viewed in FIG. 9 around the generally rectangular path defined by sprockets 94.

As the mandrels move from right to left across the horizontal upper run of their path, they pass beneath the discharge end of cup supply chute 46, and a paddle-type dispenser 48 of known construction automatically ejects a cup from the discharge end of chute 46 onto each mandrel 44 as the mandrel passes beneath the chute.

As the cup carrying mandrel moves downwardly along the left hand run of its rectangular path as viewed in FIG. 9, it passes into operative relationship with an adhesive applicator 50 whose structure is schematically illustrated in FIG. 10.

Applicator 50 includes a reservoir 100 which contains a supply of a liquid adhesive within which is partially immersed a rotatable pick up roller 102 mounted for rotation within the reservoir. Pick up roller 102 tangentially contacts one run of an endless belt 104 which is operatively trained around three direction changing rolls 106, 108 and 110 rotatably supported in the machine frame. Roll 106 is a drive roll for belt 104 and is mechanically coupled to be driven from main drive 26 in a clockwise direction as viewed in FIG. 10. Roll 110 is mechanically coupled to drive adhesive pick up roll 102 in rotation as by a mechanical coupling schematically indicated at 112.

That run of belt 104 which passes upwardly from roll 110 to roll 108 is located to be contacted by the side surface of cups C supported on mandrels 44 as the mandrels move downwardly past the adhesive applicator. Those portions of mandrels 44 upon which cups C are supported are mounted for free rotation about the cup axis so that as the cup sidewall is engaged by the adhesive-coated belt 104, the cup and mandrel are driven in rotation by the moving belt so that the cup, in effect, rolls along the belt and picks up a uniform coating of adhesive around its entire outer circumference.

Many commercially available adhesives suitable for bonding sleeves S to cups C are available, and the particular adhesive selected is chosen terms of the cup material and sleeve material. While the sleeve material has been referred to in general as paper board, for decorative purposes, other materials may well be employed as the sleeve material, as, for example, metallic foil or various plastic sheet materials. In general, a liquid-type air drying adhesive is preferred for ease of application and its relatively quick drying characteristics.

After the cups C have been coated with adhesive, they pass onto the lower horizontal run of chain 92, and the mandrels pass between a pair of spaced parallel cam plates 52 having downwardly inclined lower edges located to engage the lip of cups C on opposite sides of the mandrel. As the mandrels pass from left to right along the lower run, the downwardly inclined edges of cam plates 52 force the cup axially downwardly on the mandrel to cause the cup to drop freely into a sleeve S supported in a holder 20 which moves in synchronism with the mandrel.

The cup C drops into the sleeve by gravity, and is carried beneath a tamping mechanism 56 which employs a rotating cam 116, similar in construction and operation to cams 84, 86 and 88 of sleeve tamper 40, to tamp the cup firmly down into the sleeve.

The assembled cups and sleeves are ejected from the holders at a suitable location, the ejection being conveniently accomplished by passing spiders 82 across an inclined cam in the same fashion as was employed to elevate the sleeve.

While one embodiment of the invention has been disclosed, it will be apparent to those skilled in the art that the disclosed embodiment may be modified. Therefore,

I claim:

1. Apparatus for forming and inserting a frusto conical sleeve into a holder having a frusto conical sleeve receiving recess comprising
   blank feeding means for feeding to a ready position a blank of sheet material shaped in the form of a development of said frusto conical sleeve,
   a frusto conical mandrel mounted for movement along an endless path extending through said ready position and a transfer station,
   drive means for driving said mandrel along said path to convey said blank from said ready position to said transfer station,
   conveying means operable in synchronism with said drive means for locating a holder adjacent said transfer station with the axis of the holder recess coaxially located relative to said mandrel,
   sleeve shaping means for wrapping the blank completely around the mandrel at said transfer station to form the frusto conical sleeve,
   and stripping means at said transfer station for axially stripping the sleeve from said mandrel and depositing the sleeve in the holder recess.

2. Apparatus as defined in claim 1 wherein said sleeve shaping means comprises
   first means extending from said feeding means along opposite sides of said endless path to said transfer station for bending the blank partially around said mandrel as said mandrel moves from ready position toward said transfer station,
   and second means at said transfer station for completing the wrapping of said blank around said mandrel to form the frusto conical sleeve.

3. Apparatus as defined in claim 2 wherein the axis of said frusto conical mandrel extends in a direction normal to its path of movement,
   and said feeding means comprises a platform extending generally perpendicularly across said endless path and having an opening therethrough accommodating passage of said mandrel through said platform,
   and said blank advancing means is operable to advance blanks across said platform to said ready position wherein the blank spans said opening in symmetrical relationship thereto.

4. Apparatus as defined in claim 3 wherein said first means comprises
   a pair of guide rods fixed to said platform at opposite sides of said opening and extending therefrom in uniformly spaced relationship along opposite sides of said endless path.

5. Apparatus as defined in claim 3 wherein said platform lies in a generally horizontal plane,
   said path of movement of said mandrel being a circular path having a horizontal axis with the axis of the mandrel extending radially of said horizontal axis,
   said conveying means being movable along a second path extending beneath said transfer station with said recess axis extending vertically.

6. Apparatus as defined in claim 2 wherein said second means comprises
   a pair of star wheels mounted for free rotation about spaced parallel axes perpendicular to said path of movement of said mandrel,
   the periphery of said star wheels having semi circular recesses formed to cooperatively circumferentially surround said mandrel and the blank thereon when the mandrel axis passes through the plane containing the star wheel axes.

7. Apparatus as defined in claim 6 wherein said stripping means comprises a pair of wheels mounted for rotation at opposite sides of said path and spaced from each other to frictionally engage opposite sides of a sleeve on said mandrel
   and means for rotating said wheels in opposite direction to frictionally drive an engaged sleeve axially clear of its mandrel.

* * * * *